Nov. 3, 1964  M. PERRAULT  3,155,579
THERAPEUTIC COMPOSITION FOR THE TREATMENT OF DISTURBANCES
OF THE WATER METABOLISM CHARACTERIZED BY AN
INSUFFICIENT ELIMINATION OF WATER
Filed June 22, 1961

United States Patent Office 3,155,579
Patented Nov. 3, 1964

3,155,579
THERAPEUTIC COMPOSITION FOR THE TREATMENT OF DISTURBANCES OF THE WATER METABOLISM CHARACTERIZED BY AN INSUFFICIENT ELIMINATION OF WATER
Marcel Perrault, Paris, France, assignor to Laboratoires Laroche Navarron, Levallois, Seine, France, a French body corporate
Filed June 22, 1961, Ser. No. 118,843
5 Claims. (Cl. 167—65)

The present invention relates to the regulation of metabolism of water in living creatures.

The importance of a satisfactory functioning of this metabolism is well recognised, since disturbances of this metabolism characterized by a massive retention of water by the organism, may entail many derangements.

Disturbances of this kind may be accidental or caused as a side effect of certain remedies. Thus, an effect of desoxycorticosterone is to slow down the excretion of water by the organism to which it has been administered.

The invention aims at providing a composition adapted to act on the metabolism of water in living creatures, in order to remedy disturbances in this metabolism characterized by an insufficient elimination of water.

Figure 1:
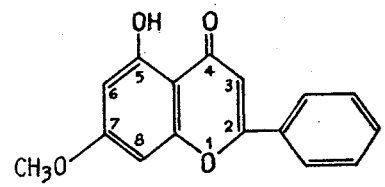

It has in fact been discovered according to the invention, that tectochrysin or 5-hydroxy-7-methoxy-flavone, the formula of which is illustrated in FIG. 1 of the accompanying drawing, accelerates the excretion of water by the organism to which it had been administered.

Techtochrysin is a compound crystallizing in the form of beautiful needles having a slight yellow colour. It melts at 166° C. on the Maquenne block (instantaneous melting).

It is insoluble in water and in cold alcohol but soluble in hot alcohol. It gives a positive reaction with ferric chloride with the obtainment of a brown-red coloration due to the presence of the phenol group at position 5.

Its centesimal analysis correspond to: C%=71.63, H%=4.51.

The U.V. spectrum of tectochrysin exhibits a maximum at 269 and 310 m$\mu$ and a minimum at 233 and 299 m$\mu$, these values being characteristic.

Tectochrysin was first isolated some time ago from the buds of the poplar tree. More recently the substance has also been found in the heart of the wood of the wild cherry, and it has also been possible to verify its structure by synthesis.

There will be given hereunder to illustrate the preparation of techtochrysin, an example of its extraction from the wood of the wild cherry.

Example 1 kg. of powdered heart wood of wild cherry-tree is extracted with ether in a continuous extraction apparatus for 24 hours. After partial distilling off of the solvent, the sirupy residue is washed with a 10% sodium carbonate solution and then with a 5% sodum hydroxide solution. The fraction insoluble in sodium hydroxide is centrifugally separated and then agitated with excess hydrochloric acid so as to dissolve the sodium ions fixed on tectochrysin. The water-insoluble precipitate is recrystalized in 95% alcohol.

The action of tectochrysin on the water metabolism has not heretofore been brought into evidence. This action appears to be due—and in this the applicant is not bound to any particular theory—to the peculiar behaviour of tectochrysin with respect to the sodium ion. As a matter of fact, whilst the other flavonic derivatives generally yield sodium salts which are soluble in water, tectochrysin produces with sodium a complex which is insoluble in water and in which the sodium appears to be chelated. This chelation seems to be due to the fact that there are two oxygen atoms in positions 4 and 5, the only free phenolic grouping of the molecule in position 5 acquiring peculiar properties owing to its proximity to the oxygen atom at 4.

The connection between the sodium ion and water metabolism being well known, it is therefore thought that this behaviour of tectochrysin with regard to sodium, forms the basis of its action on this metabolism. Moreover, tectochrysin has been found to be completely free from toxic effects.

Thus the invention has for its object a composition for the treatment of disturbances of the water metabolism in living creatures, characterized by an insufficient elimination of water which comprises tectochrysin and an administrable therapeutically inert vehicle.

In particular, the inert vehicle may be any of the solid excipients currently employed, the composition being in the form of compressed tablets or capsules administrable by mouth.

The following two formulae may be employed for the compressed tablets, for example:

|  | G. |  | G. |
|---|---|---|---|
| Tectochrysin | 0.25 | Tectochrysin | 0.50 |
| Wheat starch | 0.05 | Wheat starch | 0.10 |
| Magnesium stearate | 0.01 | Magnesium stearate | 0.02 |
| Potato starch | 0.02 | Potato starch | 0.05 |
| Lactose | 0.02 | Lactose | 0.03 |
| Final weight | 0.35 | Final weight | 0.70 |

In the form of tablets, tectochrysin may be administered at the rate of 1 g. to 10 g. per day.

The action of tectochrysin on the metabolism of water is evidenced by the following experiments:

Rats of 40 g. weight were used for the purpose.

On the first and second days of the experiment, they were subjected to a regime very poor in salt: rice washed and boiled in distilled water and, as a drink distilled water also.

On the third day of the experiment, food and drink were discontinued from 8:30 a.m.

The action of tectochrysin was studied on normal rats and on those receiving desoxycorticosterone. For this purpose the rats were separated into four groups:

The first group received the excipient and served as standard specimens for comparison, The second group received the tectorchysin, The third group received the excipient and the desoxycorticosterone, The fourth group received the tectochrysin and the same quantity of desoxycorticosterone.

The tectochrysin was given in suspension in a gum arabic solution at the rate of 50 mg. per rat, administered by tubing to the stomach:

On the first day of the experiment at 5 p.m.
On the second day of the experiment at 10 a.m. and 5 p.m.
On the third day of the experiment at 7 p.m.

The standard specimens received the gum arabic solution.

The desoxycorticosterone was administered at the rate of 100 mg. in 2 ml. of a 9% solution of NaCl given in 4 intraperitoneal injections of 0.50 ml. at hourly intervals on the 3rd day of the experiment, commencing at 9 a.m.

Groups 1 and 2 received the excipient only, that is to say 2 ml. of a 9% solution of NaCl in 4-intra-peritoneal injections.

In order to measure the quantity of liquid eliminated by the organism, procedure by weight was adopted, this being preferable to collection of urine. As a matter of fact the rat loses more than 30% of water through the rectal passage. Moreover evaporation is avoided.

Figure 2:
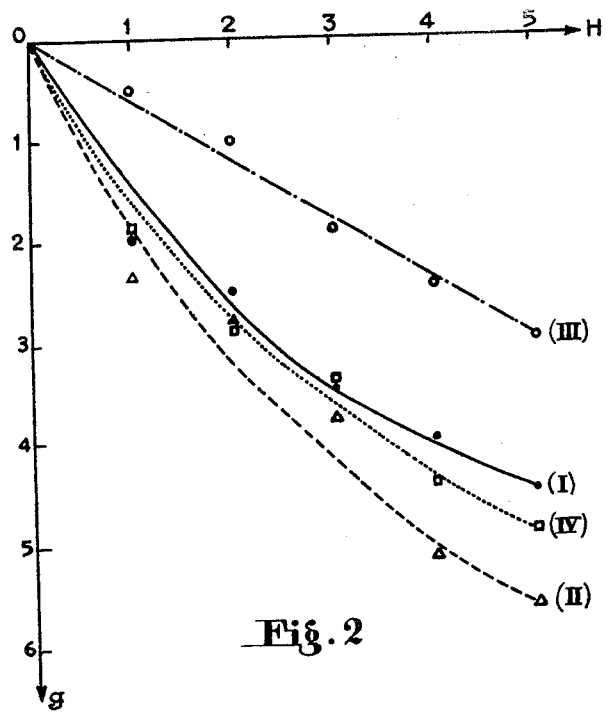

The results are plotted in curves I to IV corresponding to groups 1 to 4, FIG. 2 of the accompanying drawing.

In this graph, the abscissa records the number of hours from time 0 (zero) i.e. the moment of the fourth intraperitoneal injection whilst the ordinate records the loss of weight of the animals subjected to the tests, in grammes per 100 grams.

It will be seen from these curves that in the case of the rats receiving the desoxycorticosterone (III) elimination of water is slowed down with respect to the standard specimens (I). On the other hand, in comparison with the standard specimens (I) elimination of water is accelerated in the case of the rats receiving the tectochrysin only (II). Moreover, the administration of tectochrysin restores to normal the elimination of water slowed down by the desoxycorticosterone (IV).

It is to be understood that the invention is not limited to the embodiments described, which are only given by way of example.

Having now described my invention what I claim as new and desired to secure by Letters Patent is:

1. Orally administrable therapeutic composition for the treatment of disturbances of the water metabolism, characterized by insufficient elimination of water in unit dosage form, comprising the compound tectochrysin in an amount suitable for the daily oral administration of from about 1 gram to about 10 grams of said compound, and an orally administrable inert vehicle.

2. Therapeutic composition as claimed in claim 1, wherein said vehicle is a solid, the composition being in tablet form.

3. Process for treating disturbances of the water metabolism in patients characterized by an insufficient elimination of water, comprising orally administering to these patients tectochrysin at a daily dose of from about 1 gram to about 10 grams.

4. Orally administrable therapeutic composition for the treatment of disturbances of the water metabolism characterized by an insufficient elimination of water, in tablet form, each tablet containing about 0.25 g. of tectochrysin and a solid orally administrable inert vehicle.

5. Orally administrable therapeutic composition for the treatment of disturbances of the water metabolism characterized by an insufficient elimination of water, in tablet form, each tablet containing about 0.50 g. of tectochrysin and a solid orally administrable inert vehicle.

References Cited in the file of this patent

Chemical Abstracts (3), vol. 54, entry 18492h, 1960, citing Brule et al., Compt. Rend., vol. 250, pages 365-7, 1960.

Cecil and Loeb: A Textbook of Medicine, Tenth edition, published by W. B. Saunders Co., Philadelphia, 1959, page 667.

Willaman: Journal of the American Pharmaceutical Association, vol. 44, No. 7, July 1955, pp. 404-408.

Chemical Abst. 25-3395$^7$ July-September 1931.

Chemical Abst. 26-3298$^6$ April-June 1932.

Modern Drug Encyclopedia and Therapeutic Index, 7th edition, 1958, page 961.